J. H. Teahl,
Dry Measure.
No. 85,706.  Patented Jan. 5, 1869.
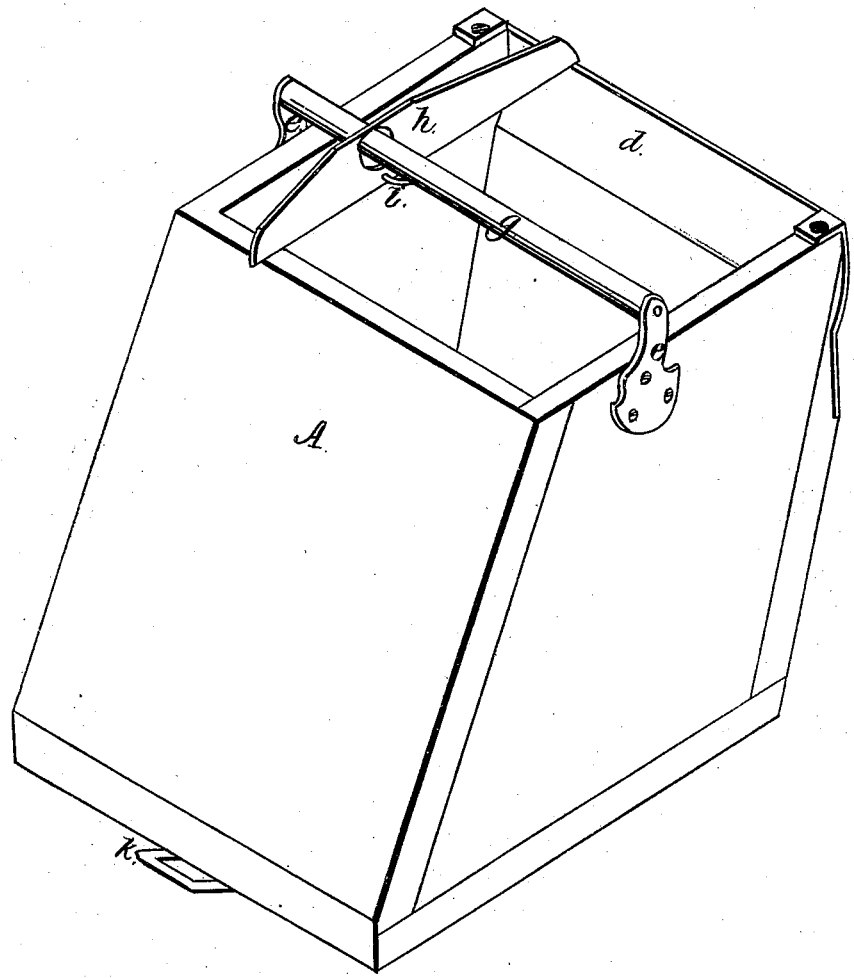
Witnesses:
J. Alfred Ellis
J. W. Master
Inventor:
J. H. Teahl
By T. H. Alexander
Atty

JOHN H. TEAHL, OF EBERLY'S MILLS, PENNSYLVANIA.

Letters Patent No. 85,706, dated January 5, 1869.

IMPROVEMENT IN DRY MEASURES.

The Schedule referred to in these Letters Patent and making part of the same.

*To all whom it may concern:*

Be it known that I, JOHN H. TEAHL, of Eberly's Mills, in the county of Cumberland, and State of Pennsylvania, have invented certain new and useful Improvements in Dry Measures; and I do hereby declare that the following is a full, clear, and exact description thereof, reference being had to the accompanying drawings, and to the letters of reference marked thereon, which form a part of this specification, in which—

Figure 1 is a perspective view of my measure.

The object of my invention is to provide a dry measure, more easily and effectively operated than those now in use; and to this end, My invention consists, first, in the peculiar shape of the measure, and, second, in the employment of a stroker, when arranged in the manner hereinafter set forth.

To enable others to enjoy the benefits of my invention, I will now describe its construction and operation.

In the accompanying drawings—

A represents my measure, which I make rhomboidal in shape, or nearly so.

The front upper part of the side pieces should be at right angles with the plane of the top, and across this portion of the measure is secured the metal plate *d*, which acts as a scoop.

*e e* are ears, between which is firmly fastened the handle or bail *g*. I form this bail by bending sheet-metal in the shape of a roller, leaving the two sides a little separated, thus forming a slot. In securing the bail between the ears, this slot is placed downward.

*h* represents a stroker, extending across the top of the measure. It is provided with a hole, through which the bail extends.

This stroker or scraper is also furnished with wire projections, *i i*, which are bent upwards, so as to enter the slot in the bail, thus serving to strengthen and support the stroker.

K is a loop or lifter, secured to the lower rear side of the measure.

The advantage in constructing a measure in this manner is that it will enter the grain, &c., more easily than the ordinary measure, while the discharging of it is likewise greatly facilitated.

What I claim, and desire to secure by Letters Patent, is—

1. The bail *g* and stroker *h*, constructed and operated substantially as and for the purpose described.

2. In combination with the above, the measure A, substantially in the manner and for the purpose set forth.

In testimony that I claim the foregoing as my own, I affix my signature, in presence of two witnesses.

JNO. H. TEAHL.

Witnesses:
G. W. CRISWELL,
JOS. G. VALE.